(12) United States Patent
Norbeck et al.

(10) Patent No.: US 7,897,649 B2
(45) Date of Patent: Mar. 1, 2011

(54) OPERATION OF A STEAM METHANE REFORMER BY DIRECT FEEDING OF STEAM RICH PRODUCER GAS FROM STEAM HYDRO-GASIFICATION

(75) Inventors: Joseph M. Norbeck, Riverside, CA (US); Chan Seung Park, Placentia, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/879,266

(22) Filed: Jul. 16, 2007

(65) Prior Publication Data
US 2008/0021122 A1    Jan. 24, 2008

Related U.S. Application Data

(63) Continuation-in-part of application No. 11/489,308, filed on Jul. 18, 2006, now abandoned.

(51) Int. Cl.
*C07C 27/00* (2006.01)
(52) U.S. Cl. .......... 518/704; 518/700; 518/702; 518/703; 518/705; 518/706
(58) Field of Classification Search ........... 518/700–706
See application file for complete search history.

(56) References Cited

U.S. PATENT DOCUMENTS

| | | |
|---|---|---|
| 2,987,387 A | 6/1961 | Carkeek et al. |
| 3,847,567 A | 11/1974 | Kalina et al. |
| 3,917,468 A | 11/1975 | Van Den Berg et al. |
| 3,926,775 A | 12/1975 | Schroeder |
| 3,929,431 A * | 12/1975 | Koh et al. ............ 48/214 R |
| 3,957,460 A | 5/1976 | Lee |
| 3,977,836 A | 8/1976 | Matsuda et al. |
| 3,985,519 A * | 10/1976 | Kalina et al. .............. 48/202 |
| 4,012,311 A | 3/1977 | Greene |
| 4,073,698 A | 2/1978 | Blurton et al. |
| 4,118,204 A | 10/1978 | Eakman et al. |
| 4,158,697 A | 6/1979 | Cramer |
| 4,211,540 A | 7/1980 | Netzer |
| 4,244,706 A | 1/1981 | Forney et al. |
| 4,341,530 A | 7/1982 | Loth et al. |
| 4,348,487 A | 9/1982 | Goldstein et al. |
| 4,372,755 A | 2/1983 | Tolman et al. |

(Continued)

FOREIGN PATENT DOCUMENTS

EP    0105659 A2    4/1984

(Continued)

OTHER PUBLICATIONS

Olsen et al, Unit processes and Principles of Chemical Engineering, D. Van Nostrand Company, 1932, pp. 1-3.*

(Continued)

*Primary Examiner* — Jafar Parsa
(74) *Attorney, Agent, or Firm* — Berliner & Associates

(57) ABSTRACT

An improved, economical alternative method to supply steam and methane to a steam methane reformer (SMR) is accomplished by a combination of procedures, wherein product gas from a steam hydro-gasification reactor (SHR) is used as the feedstock for the SMR by removing impurities from the product stream from the SHR with a gas cleanup unit that operates substantially at process pressures and at a temperature above the boiling point of water at the process pressure, is located between the SHR and SMR.

16 Claims, 2 Drawing Sheets

U.S. PATENT DOCUMENTS

| | | | |
|---|---|---|---|
| 4,385,905 A | 5/1983 | Tucker et al. | |
| 4,394,239 A | 7/1983 | Kitzelmann et al. | |
| 4,397,888 A | 8/1983 | Yannopoulos et al. | |
| 4,483,691 A | 11/1984 | McShea et al. | |
| 4,526,903 A | 7/1985 | Cummings | |
| 4,560,547 A | 12/1985 | Schora et al. | |
| 4,597,776 A | 7/1986 | Ulman et al. | |
| 4,822,935 A * | 4/1989 | Scott | 585/240 |
| 4,833,171 A | 5/1989 | Sweeney | |
| 4,983,296 A | 1/1991 | McMahon et al. | |
| 5,250,175 A | 10/1993 | Des Ormeaus | |
| 5,344,848 A | 9/1994 | Steinberg et al. | |
| 5,427,762 A | 6/1995 | Steinberg et al. | |
| 5,439,580 A | 8/1995 | Akbar et al. | |
| 5,447,559 A | 9/1995 | Rao et al. | |
| 5,496,859 A | 3/1996 | Fong et al. | |
| RE35,377 E | 11/1996 | Steinbert et al. | |
| 5,656,044 A | 8/1997 | Bishop et al. | |
| 6,053,954 A | 4/2000 | Anderson et al. | |
| 6,225,358 B1 | 5/2001 | Kennedy | |
| 6,350,288 B1 | 2/2002 | Hirayama et al. | |
| 6,495,610 B1 | 12/2002 | Brown | |
| 6,527,980 B1 | 3/2003 | Roden et al. | |
| 6,612,269 B2 | 9/2003 | Heffel et al. | |
| 7,208,530 B2 * | 4/2007 | Norbeck et al. | 518/704 |
| RE40,419 E | 7/2008 | Norbeck et al. | |
| 2002/0095867 A1 | 7/2002 | Katayama | |
| 2003/0022035 A1 | 1/2003 | Galloway | |
| 2005/0032920 A1 | 2/2005 | Norbeck et al. | |
| 2005/0165261 A1 | 7/2005 | Abazzajiian et al. | |
| 2005/0256212 A1 | 11/2005 | Norbeck et al. | |
| 2008/0016770 A1 | 1/2008 | Norbeck et al. | |
| 2008/0021123 A1 | 1/2008 | Norbeck et al. | |

FOREIGN PATENT DOCUMENTS

| | | |
|---|---|---|
| EP | 0874236 A2 | 10/1998 |
| EP | 0 952 132 A1 | 10/1999 |
| WO | WO 99/26051 A2 | 5/1999 |
| WO | WO 02/44704 A2 | 6/2002 |
| WO | WO03/066517 A1 | 8/2003 |
| WO | PCT/US2007/021594 | 10/2007 |

OTHER PUBLICATIONS

A.S.K. Raju, C.S. Park and J.M. Norbeck, Synthesis Gas Production using Steam Hydrogasification and Steam Reforming, Accepted, Fuel Proc. Tech., 2008.

V.P. Natarajan and G.J. Supes, Rheological studies on a slurry biofuel to aid in evaluating its suitability as a fuel, Fuel, vol. 76, 1997, pp. 1527-2535.

G. Atesok, F. Boylu, A.A. Sirkeci and H. Dincer, The effect of coal properties on the viscosity of coal-water slurries, Fuel, vol. 81, 2002, pp. 1855-1858.

F. Boylu, H. Dincer and G. Atesok, Effect of coal particle size distribution, volume fraction and rank on the rheology of coal-water slurries, Fuel Proc. Tech., vol. 85, 2004, pp. 241-250.

N. V. Pimenova and T. R. Hanley, Measurement of rheological properties of corn stover susspensions, App. Biochem. and Biotech., vol. 105-108, 2003, pp. 383-392.

H. A. Barnes and Q. D. Nguyen, Rotating vane rheometry—a review, J. Non-Newtonian Fluid Mech. vol. 98, 2001, pp. 1-14.

N. I. Heywood, Stop you slurries from stirring up trouble, Chem. Engr Proc. vol. 95, 1999, pp. 21-40.

S. K. Majumder, K. Chandna, D. S. De and G. Kundu, Studies on flow characteristics of coal-oil-water slurry system, Int. J of Miner. Proc., vol. 79, 2006, pp. 217-224.

Ayhan Demirbas, Thermochemical Conversion of Biomass to Liquid Products in the Aqueous Medium, *Energy Sources*, 27:1235-1243, 2005.

Kreda, Silvia et al, G-protein-coupled receptors as targets for gene transfer vectors using natural small-molecular ligands, *Nature Biotechnology*, vol. 18 Jun. 2000.

Steynberg, A.; Dry, M., FT Technology Studies in surf Science and Catalysis, ec., vol. 152, 2005.

Sheldon, R.A. Chemicals from Synthesis Gas, 1983.

Van der Laan, G.P., Thesis, University of Groningen, Netherlands, 1999.

Hepola, Jouko et al, Sulphur poisoning of nickel-based hot gas cleaning catalysts in synthetic gasification gas I. Effect of different process parameters, *B. Environmental*, 14 (1997) 287-303.

Chen, Ienwhei et al, Resistivity to Sulfur Poisoning of Nickel-Alumina Catalysts, *Ind. Eng. Chem. Res* 1988, 27, 1391-1396.

Sehested Jens, Four challenges for nickel steam-reforming catalysts, *catalysisToday*, 111 (2006) 103-110.

Tomita, Akira, et al., Sulfur Poisoning in the Nickel Catalyzed Gasification of Activated Carbon in Hydrogen, *Carbon*, vol. 21, No. 3 pp. 225-229, 1983.

* cited by examiner

US 7,897,649 B2

OPERATION OF A STEAM METHANE REFORMER BY DIRECT FEEDING OF STEAM RICH PRODUCER GAS FROM STEAM HYDRO-GASIFICATION

CROSS-REFERENCE TO RELATED APPLICATIONS

This application is a continuation-in-part, and claims the benefit of, patent application Ser. No. 11/489,308, filed Jul. 18, 2006 now abandoned.

FIELD OF THE INVENTION

The field of the invention is the synthesis of transportation fuel from carbonaceous feed stocks.

BACKGROUND OF THE INVENTION

There is a need to identify new sources of chemical energy and methods for its conversion into alternative transportation fuels, driven by many concerns including environmental, health, safety issues, and the inevitable future scarcity of petroleum-based fuel supplies. The number of internal combustion engine fueled vehicles worldwide continues to grow, particularly in the midrange of developing countries. The worldwide vehicle population outside the U.S., which mainly uses diesel fuel, is growing faster than inside the U.S. This situation may change as more fuel-efficient vehicles, using hybrid and/or diesel engine technologies, are introduced to reduce both fuel consumption and overall emissions. Since the resources for the production of petroleum-based fuels are being depleted, dependency on petroleum will become a major problem unless non-petroleum alternative fuels, in particular clean-burning synthetic diesel fuels, are developed. Moreover, normal combustion of petroleum-based fuels in conventional engines can cause serious environmental pollution unless strict methods of exhaust emission control are used. A clean burning synthetic diesel fuel can help reduce the emissions from diesel engines.

The production of clean-burning transportation fuels requires either the reformulation of existing petroleum-based fuels or the discovery of new methods for power production or fuel synthesis from unused materials. There are many sources available, derived from either renewable organic or waste carbonaceous materials. Utilizing carbonaceous waste to produce synthetic fuels is an economically viable method since the input feed stock is already considered of little value, discarded as waste, and disposal is often polluting. Alternatively, one can use coal as a feedstock to upgrade low grade dirty solid fuel to a value added convenient clean liquid fuel, such as high quality, environment friendly synthetic diesel or other hydrocarbon fuels.

Liquid transportation fuels have inherent advantages over gaseous fuels, having higher energy densities than gaseous fuels at the same pressure and temperature. Liquid fuels can be stored at atmospheric or low pressures whereas to achieve liquid fuel energy densities, a gaseous fuel would have to be stored in a tank on a vehicle at high pressures that can be a safety concern in the case of leaks or sudden rupture. The distribution of liquid fuels is much easier than gaseous fuels, using simple pumps and pipelines. The liquid fueling infrastructure of the existing transportation sector ensures easy integration into the existing market of any production of clean-burning synthetic liquid transportation fuels.

The availability of clean-burning liquid transportation fuels is a national priority. Producing synthesis gas (a mixture of hydrogen and carbon monoxide, also referred to as synthesis gas) cleanly and efficiently from carbonaceous sources, that can be subjected to a Fischer-Tropsch type process to produce clean and valuable synthetic gasoline and diesel fuels, will benefit both the transportation sector and the health of society. A Fischer-Tropsch type process or reactor, which is defined herein to include respectively a Fischer-Tropsch process or reactor, is any process or reactor that uses synthesis gas to produce a liquid fuel. Similarly, a Fischer-Tropsch type liquid fuel is a fuel produced by such a process or reactor. A Fischer-Tropsch type process allows for the application of current state-of-art engine exhaust after-treatment methods for $NO_x$ reduction, removal of toxic particulates present in diesel engine exhaust, and the reduction of normal combustion product pollutants, currently accomplished by catalysts that are poisoned quickly by any sulfur present, as is the case in ordinary stocks of petroleum derived diesel fuel, reducing the catalyst efficiency. Typically, Fischer-Tropsch type liquid fuels, produced from synthesis gas, are sulfur-free, aromatic free, and in the case of synthetic diesel fuel have an ultrahigh cetane value.

Biomass material is the most commonly processed carbonaceous waste feed stock used to produce renewable fuels. Waste plastic, rubber, manure, crop residues, forestry, tree and grass cuttings and biosolids from waste water (sewage) treatment are also candidate feed stocks for conversion processes. Biomass feed stocks can be converted to produce electricity, heat, valuable chemicals or fuels. California tops the nation in the use and development of several biomass utilization technologies. Each year in California, more than 45 million tons of municipal solid waste is discarded for treatment by waste management facilities. Approximately half this waste ends up in landfills. For example, in just the Riverside County, California area, it is estimated that about 4000 tons of waste wood are disposed of per day. According to other estimates, over 100,000 tons of biomass per day are dumped into landfills in the Riverside County collection area. This municipal waste comprises about 30% waste paper or cardboard, 40% organic (green and food) waste, and 30% combinations of wood, paper, plastic and metal waste. The carbonaceous components of this waste material have chemical energy that could be used to reduce the need for other energy sources if it can be converted into a clean-burning fuel. These waste sources of carbonaceous material are not the only sources available. While many existing carbonaceous waste materials, such as paper, can be sorted, reused and recycled, for other materials, the waste producer would not need to pay a tipping fee, if the waste were to be delivered directly to a conversion facility. A tipping fee, presently at $30-$35 per ton, is usually charged by the waste management agency to offset disposal costs. Consequently not only can disposal costs be reduced by transporting the waste to a waste-to-synthetic fuels processing plant, but additional waste would be made available because of the lowered cost of disposal.

The burning of wood in a wood stove is a simple example of using biomass to produce heat energy. Unfortunately, open burning of biomass waste to obtain energy and heat is not a clean and efficient method to utilize the calorific value. Today, many new ways of utilizing carbonaceous waste are being discovered. For example, one way is to produce synthetic liquid transportation fuels, and another way is to produce energetic gas for conversion into electricity.

Using fuels from renewable biomass sources can actually decrease the net accumulation of greenhouse gases, such as carbon dioxide, while providing clean, efficient energy for transportation. One of the principal benefits of co-production of synthetic liquid fuels from biomass sources is that it can provide a storable transportation fuel while reducing the effects of greenhouse gases contributing to global warming. In the future, these co-production processes could provide clean-burning fuels for a renewable fuel economy that could be sustained continuously.

A number of processes exist to convert coal and other carbonaceous materials to clean-burning transportation fuels, but they tend to be too expensive to compete on the market with petroleum-based fuels, or they produce volatile fuels, such as methanol and ethanol that have vapor pressure values too high for use in high pollution areas, such as the Southern California air-basin, without legislative exemption from clean air regulations. An example of the latter process is the Hynol Methanol Process, which uses hydro-gasification and steam reformer reactors to synthesize methanol using a co-feed of solid carbonaceous materials and natural gas, and which has a demonstrated carbon conversion efficiency of >85% in bench-scale demonstrations.

More recently, a process was developed in our laboratories to produce synthesis gas in which a slurry of particles of carbonaceous material in water, and hydrogen from an internal source, are fed into a hydro-gasification reactor under conditions to generate rich producer gas. This is fed along with steam into a steam pyrolytic reformer under conditions to generate synthesis gas. This process is described in detail in Norbeck et al. U.S. patent application Ser. No. 10/503,435 (published as US 2005/0256212), entitled: "Production Of Synthetic Transportation Fuels From Carbonaceous Material Using Self-Sustained Hydro-Gasification." In a further version of the process, using a steam hydro-gasification reactor (SHR) the carbonaceous material is heated simultaneously in the presence of both hydrogen and steam to undergo steam pyrolysis and hydro-gasification in a single step. This process is described in detail in Norbeck et al. U.S. patent application Ser. No. 10/911,348 (published as US 2005/0032920), entitled: "Steam Pyrolysis As A Process to Enhance The Hydro-Gasification of Carbonaceous Material." The disclosures of U.S. patent application Ser. Nos. 10/503,435 and 10/911,348 are incorporated herein by reference.

Producing synthesis gas via gasification and producing a liquid fuel from synthesis gas are totally different processes. Of particular interest to the present invention is the production of synthesis gas using a steam methane reformer (SMR), a reactor that is widely used to produce synthesis gas for the production of liquid fuels and other chemicals. The reactions taking place in the SMR can be written as follows.

$$CH_4 + H_2O \rightarrow CO + 3H_2 \tag{1}$$

or

$$CH_4 + 2H_2O \rightarrow CO_2 + 4H_2 \tag{2}$$

Carbon monoxide and hydrogen are produced in the SMR by using steam and methane as the feed. Heating process water in a steam generator produces the required steam. The methane is usually supplied in the form of compressed natural gas, or by means of a light molecular weight off-gas stream from a chemical or refinery process.

BRIEF SUMMARY OF THE INVENTION

This invention provides an improved, economical alternative method to supply steam and methane to an SMR. This is accomplished by a combination of new procedures, wherein product gas from an SHR is used as the feedstock for the SMR by removing impurities from the product stream from the SHR with a gas cleanup unit that operates at process pressures and is located in between the SHR and SMR.

In one embodiment of the invention, product gas from an SHR is used as the feedstock for the SMR. As described above, this steam and methane rich product gas is generated by means of hydro-gasification of the slurry, which is a mixture of carbonaceous material and water. This product gas, a mixture of methane rich gas and steam, where the steam is present as a result of the superheating the water in the feedstock, serves as an ideal feed stream for the SMR.

The other procedure requires removing impurities from the product stream from the SHR, such as fine particles of ash & char, hydrogen sulfide ($H_2S$) and other inorganic components. These impurities must be removed in order to prevent poisoning of the catalyst used in the SMR. Conventionally, a combination of particulate filters, a solvent wash (amines, Selexol™, Rectisol™), and hydro-desulphurization by means of the Claus process are used for this purpose. In the Claus process, $H_2S$ is partially oxidized with air in a reaction furnace at high temperatures (1000-1400 deg C.). Sulfur is formed, but some $H_2S$ remains unreacted, and some $SO_2$ is made requiring that the remaining $H_2S$ be reacted with the $SO_2$ at lower temperatures (about 200-350 deg C.) over a catalyst to make more sulfur. However, because the SMR feed stream needs to be maintained at high temperatures, re-heating of the gas stream consumes a significant amount of energy. Consequently, these conventional clean-up techniques are prohibitive from an energy viewpoint. Moreover, the benefits supplied by retaining the steam from the SHR product stream are lost. Accordingly, in another embodiment of the invention, a gas cleanup unit is provided that operates at process pressures and is located in between the SHR and SMR.

More particularly, a process is provided for converting carbonaceous material to synthesis gas, comprising simultaneously heating carbonaceous material in the presence of both hydrogen and steam, at a temperature and pressure sufficient to generate a stream of methane and carbon monoxide rich gas product, which can be called a producer gas. Impurities are removed from the producer gas stream substantially at the process temperature and pressure, and the resultant producer gas is subjected to steam methane reforming under conditions whereby synthesis gas comprising hydrogen and carbon monoxide is generated. In a specific process, for converting municipal waste, biomass, wood, coal, or a natural or synthetic polymer to synthesis gas, the carbonaceous material is simultaneously heated in the presence of both hydrogen and steam, at a temperature of about 700° C. to about 900° C. and pressure about 132 psi to 560 psi whereby to generate a stream of methane and carbon monoxide rich producer gas. Impurities are removed from the producer gas stream substantially at the process temperature and pressure, following which the resultant producer gas is subjected to steam methane reforming under conditions whereby to generate synthesis gas comprising hydrogen and carbon monoxide at a $H_2$:CO mole ratio range of about 3 to 1. The required $H_2$:CO mole ratio of a Fischer-Tropsche reactor with a cobalt based catalyst is 2:1. Accordingly, there is an excess of hydrogen, which can be separated and fed into the SHR to make a self-sustainable process, i.e., without requiring an external hydrogen feed. The synthesis gas generated by the steam methane reforming can be fed into a Fischer-Tropsch reactor under conditions whereby a liquid fuel is produced. Exothermic heat from the Fischer-Tropsch reaction can be transferred to the steam hydro-gasification reaction and/or steam methane reforming reaction.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

This invention provides a combination of procedures, where in one embodiment of the invention, the feedstock for an SMR is a mixture of steam and methane rich product gas generated by means of hydro-gasification of a mixture of carbonaceous material and water in an SHR. The steam is present as a result of superheating the water in the feedstock and serves as an ideal feed stream for the SMR.

The other procedure requires a method of removing impurities from the product stream from the SHR, such as fine particles of ash & char, hydrogen sulfide ($H_2S$) and other inorganic components. These impurities must be removed in order to prevent poisoning of the catalyst used in the SMR while maintaining the SMR feed stream at its high process temperatures. Accordingly, in another embodiment of the invention, a gas cleanup unit is provided that operates at the process pressure and at a temperature above the boiling point of water at the process pressure, and is located between the SHR and SMR.

Figure 1:
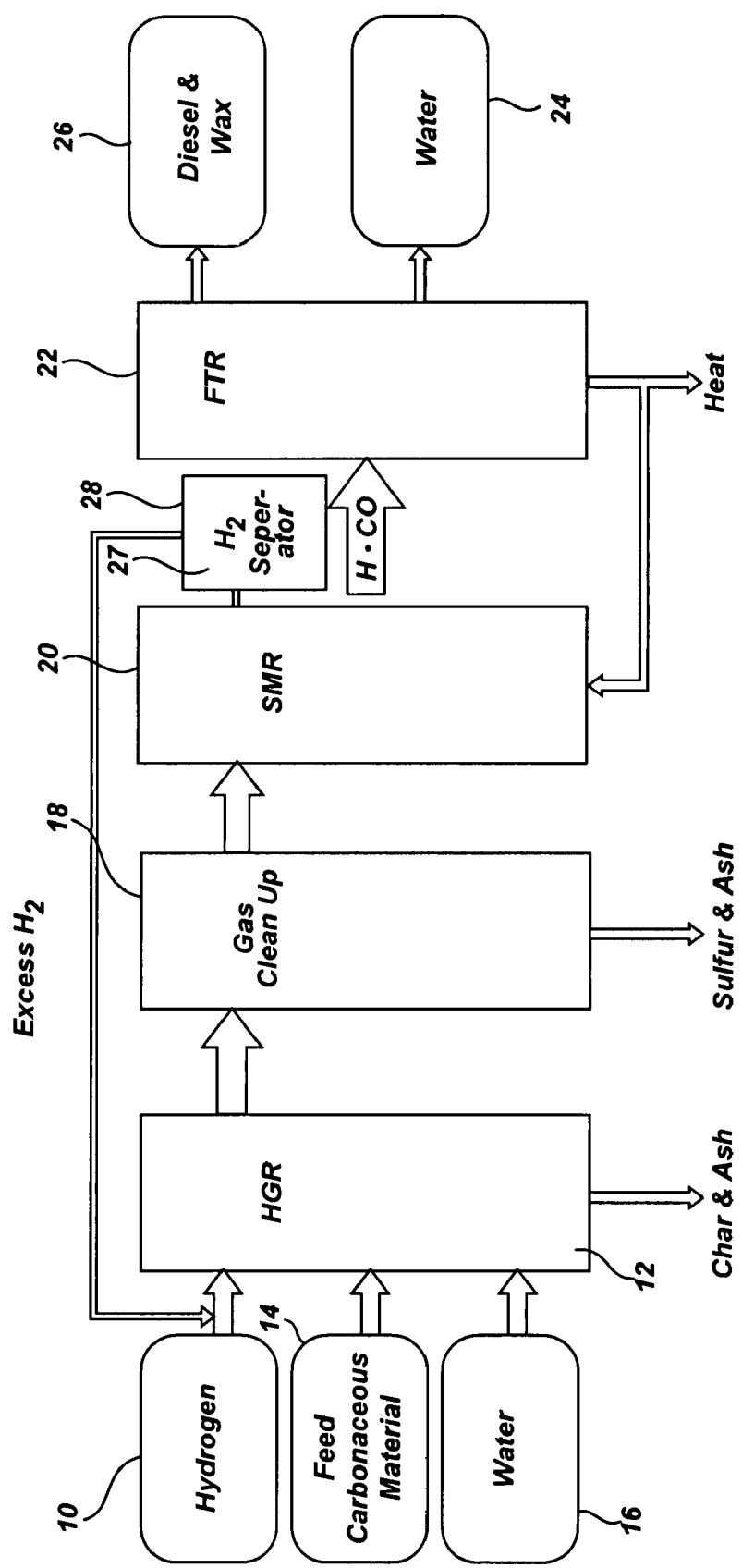
FIG. 1 is a flow diagram of the process of this invention.

Referring to FIG. 1, a flow diagram of the process is shown. An internally generated hydrogen feed 10 is fed into an SHR 12 along with a carbonaceous feedstock 14 and water 16, which are heated to 750° C. at 400 psi in the SHR 12. The resulting producer gas is directed to a gas clean up filter 18, e.g. a candle filter assembly, at about 350° C. at about 400 psi. From there, after removal of sulfur and ash, the effluent is directed to an SMR 20 where synthesis gas is generated and fed to a Fischer-Tropsch reactor 22, from which pure water 24, diesel fuel and/or wax 26 is obtained. A portion of hydrogen is diverted from the SMR 20, at 28 to be fed back to the SHR 12. Heat 30 from the Fischer-Tropsch reactor 22 is used to supplement the heat at the SMR.

Figure 2:
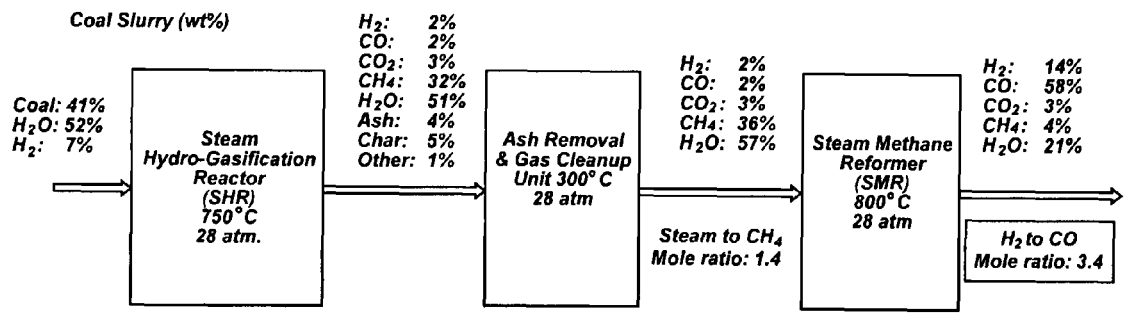
FIG. 2 is a flow diagram of the mass balance of the process.

Operating the unit above the bubbling temperature of the water allows the water to be present as steam in the gaseous product stream from the SHR, thereby enabling the process to retain most of the sensible heat in the effluent stream. A mass balance process flow diagram is shown in FIG. 2. The mass percentages of the product stream at each stage of the process are provided in the figure. ASPEN PLUS™ equilibrium process modeling was used to calculate these values. ASPEN PLUS™ is a commercial computer modeling program ASPEN PLUS™ that allows a process model to be created by specifying the chemical components and operating conditions. The program takes all of the specifications and simulates the model, executing all necessary calculations needed to solve the outcome of the system, hence predicting its behavior. When the calculations are complete, ASPEN PLUS™ lists the results, stream by stream and unit by unit. As shown in FIG. 2, an SHR feedstock of hydrogen and 41% coal slurry results in the production of synthesis gas with a 3.4:1 mole ratio of hydrogen to carbon monoxide in the SMR. The required feed hydrogen for the SHR can be supplied through external means or by internal feedback of a portion of the hydrogen produced in the SMR. In a particular example, a slurry of 41% coal, 52% water and 7% hydrogen is used, obtained following the procedures of Norbeck et al. U.S. Ser. No. 10/911,348, Any filter capable of operating at a temperature above the boiling point of water at the process pressure can be used. One such commercially available filter is a candle filter, which is well known to the art. See, for example U.S. Pat. No. 5,474,586, the disclosure of which is incorporated herein by reference. An available gas cleanup unit that can be used in this invention is what is known as a candle filter in which a series of candle-shaped filters are carried in a filter vessel. The candle filters are made of stainless steel metal frit to remove fine particulate matter (ash, inorganic salts and un-reacted char) from the gas stream. The slurry is fed into the vessel at a bottom inlet and filtrate taken out at a top outlet. Particulate matter is taken from another outlet as cake. Sulfur impurities existing in the SHR product gas, mostly in the form of hydrogen sulfide, are removed by passing the product gas through a packed bed of metal oxide sorbents in the gas cleanup unit, particulate matter being taken from a cake outlet.

Active sorbents include, but are not limited to, Zn based oxides such as zinc oxide, sold by Süd-Chemie, Louisville, Ky. Porous metal filter elements are available from Bekaert in Marietta, Ga. in the appropriate forms and sizes, such as Bekpor® Porous Media—which is made from stainless steel sintered fiber matrix with a pore size of 1. These sorbents and filter elements allow the effects of pressure drop and gas-solid mass transfer limitations to be minimized. At a pressure of 28 atm., temperatures in the range of 300° C. to 500° C. and space velocities up to 2000/hr have been used in the desulphurization of SHR product gas. The hydrogen sulfide content of the gas is diminished by means of sulfidation of the sorbents to levels low enough to avoid the deactivation of the SMR catalyst. The used sorbents in the gas cleanup unit can either be replaced with fresh sorbents or regenerated in-situ with diluted air in parallel multiple sorbent beds.

Figure 3:
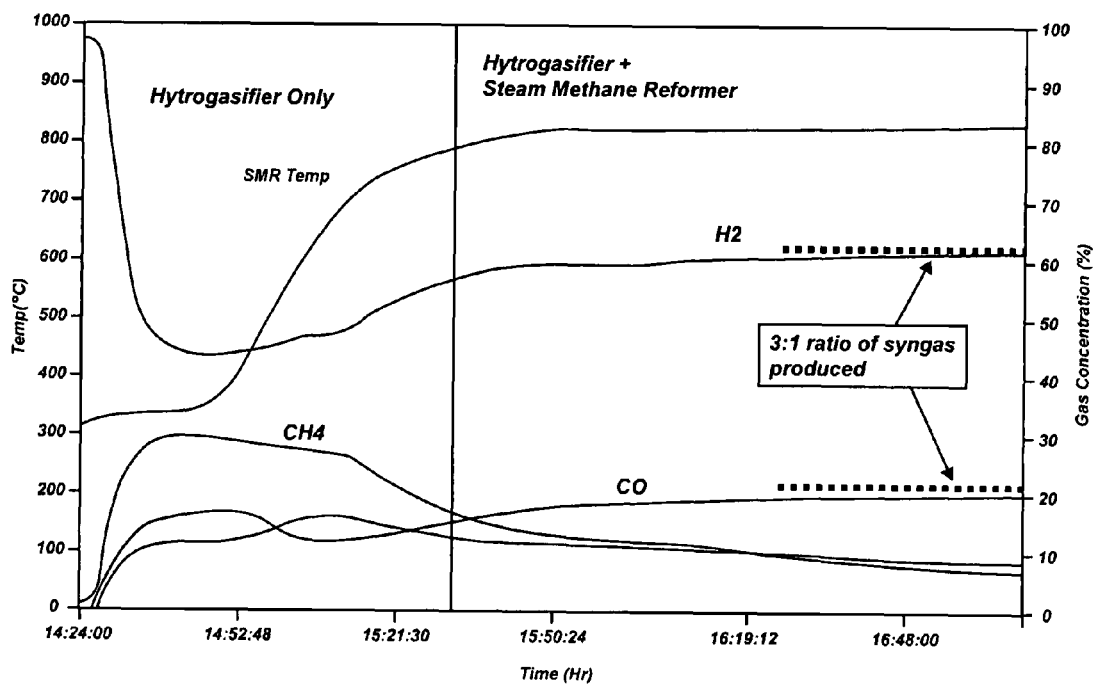
FIG. 3 graphically depicts the components produced with and without the invention.

Experimental data demonstrating the successful operation of the SMR with direct feeding of the SHR product stream is shown in FIG. 3. The concentrations of the gas measured at the exit of the SMR are plotted along with the SMR temperature profile. When the temperature of the SMR is low, the major product observed at the SMR exit is methane (since the SHR is the only reactor being operated). As the temperature of the SMR increases, the methane concentration decreases and a corresponding increase in the hydrogen and carbon monoxide concentrations is observed. The final composition of synthesis gas produced in the SMR has a $H_2$:CO mole ratio of 3:1. More generally, the process of this invention can produce composition of synthesis gas having a $H_2$:CO mole ratio range of 2:1 to 6:1.

The resulting effluent is a synthesis of gases rich in hydrogen, carbon monoxide, and steam. Approximately one third of the hydrogen produced in the SMR is recycled back to the SHR. Consequently, no outside source of hydrogen is needed to maintain steady state operation. The SHR and SMR processes, therefore, may be considered to be chemically self-sustaining. The remaining synthesis gas is then available for the production of fuels and process heat.

In an embodiment of the invention, the synthesis gas is fed to a Fischer-Tropsch reactor in a process that can produce a zero-sulfur, ultrahigh cetane value diesel-like fuel and valuable paraffin wax products. The absence of sulfur enables low pollutant and particle emitting diesel fuels to be realized. Useful by-products can be produced, foe example, purified water, which can be re-cycled to create the slurry feed into the process. The Fischer-Tropsch reactions also produce tail gas that contains hydrogen, CO, $CO_2$, and some light hydrocarbon gases. Hydrogen can be stripped out of the tail gas and recycled either to the SHR or the Fischer-Tropsch reactor. Any small amounts of other gases such as CO and $CO_2$ may be flared off.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process and apparatus described in the specification. As one of ordinary skill in the art will readily appreciate from the disclosure of the present invention, processes and apparatuses, presently existing or later to be developed that perform substantially the same function or achieve substantially the same result as the corresponding embodiments described herein may be utilized according to the present invention. Accordingly, the appended claims are intended to include such processes and use of such apparatuses within their scope.

The invention claimed is:

1. A process for converting carbonaceous material to synthesis gas, comprising:
   heating a slurry, comprising water and carbonaceous material, with hydrogen
   in a steam hydrogasifier reactor, at a sufficient temperature and pressure to generate a stream of methane, carbon monoxide, and steam rich product gas; wherein the steam in the hydrogasifier is generated as the result of superheating the slurry water;
   removing sulfur impurities from the producer gas stream; and
   subjecting the resultant product gas to steam methane reforming, conditions;
   whereby synthesis gas comprising hydrogen and carbon monoxide is generated at a ratio of between 2:1 and 6:1.

2. The process of claim 1 wherein the temperature is about 700° C. to about 900° C.

3. The process of claim 1 wherein impurities are removed from the producer gas stream at substantially said pressure.

4. The process of claim 1 wherein steam methane reforming is conducted under conditions whereby the composition of synthesis gas exiting the SMR has a $H_2$:CO mole ratio range of 2:1 to 6:1.

5. The process of claim 1 wherein the steam methane reforming is conducted under conditions whereby the composition of synthesis gas exiting the SMR has a $H_2$:CO mole ratio of 3:1.

6. The process of claim 1 wherein the carbonaceous material comprises municipal waste, biomass, wood, coal, or a natural or synthetic polymer.

7. The process of claim 1 in which synthesis gas generated by the steam methane reforming is fed into a Fischer-Tropsch reactor under conditions whereby a liquid fuel is produced.

8. A process for converting municipal waste, biomass, wood, coal, or a natural or synthetic polymer to synthesis gas, comprising:
   simultaneously heating carbonaceous material, in a steam hydrogasifier reactor, in the presence of both hydrogen and water, at about 700° C. to about 900° C. and pressure about 132 psi to 560 psi; to generate steam, methane and carbon monoxide rich producer gas; wherein the steam generated in the hydrogasifier is the result of superheating the slurry water;
   removing sulfur impurities from the producer gas stream substantially at said pressure and at a temperature above the boiling point of water;
   subjecting the resultant product gas to steam methane reforming conditions
   whereby to generate synthesis gas comprising hydrogen and carbon monoxide at a ratio of between 2:1 and 6:1.

9. The process of claim 8 comprising transferring exothermic heat from the Fischer-Tropsch reaction to the hydrogasification reaction and/or steam methane reforming reaction.

10. The process of claim 1, wherein the steam methane reforming conducted is using steam only generated from said simultaneous heating step.

11. The process of claim 1, wherein the sulfur impurities is $H_2S$.

12. The process of claim 1, wherein removing impurities from the producer gas stream is at a temperature above the boiling point of water at the process pressure.

13. The process of claim 1, wherein steam is also generated from the simultaneously heating of the slurry of carbonaceous material in the presence of both hydrogen and water.

14. The process of claim 13, wherein the steam generated is sufficient to supply the steam methane reforming reactor whereby synthesis gas comprising hydrogen and carbon monoxide is generated.

15. The process of claim 1, wherein the simultaneously heating of said slurry of carbonaceous material and hydrogen is performed without a reaction catalyst.

16. A process for converting carbonaceous material to synthesis gas, comprising:
   simultaneously heating the carbonaceous material in the presence of hydrogen and water, at a sufficient temperature and pressure, to generate steam, methane and carbon monoxide rich producer gas; wherein the steam generated within the hydrogasifier is the result of superheating the slurry water;
   removing sulfur impurities from the producer gas stream, wherein removing impurities from the producer gas stream is at a temperature above the boiling point of water at about 132 psi to 560 psi; and
   subjecting the resultant producer gas to steam methane reforming, under conditions whereby synthesis gas comprising hydrogen and carbon monoxide at a ratio of between 2:1 and 6:1 is generated.

* * * * *